Patented Apr. 13, 1954

2,675,405

UNITED STATES PATENT OFFICE 2,675,405

SALTS OF P-AMINOBENZOIC ACID AND ALKYLAMINES AND AMINO-ALCOHOLS

Gino Carrara, Milan, Italy, assignor to Lepetit S. A., Milan, Italy

No Drawing. Application September 22, 1950, Serial No. 186,311

5 Claims. (Cl. 260—501)

My invention relates to improved pharmaceutical preparations characterized by the presence therein of a p-aminobenzoic acid salt of an alkylamine or of an aminoalcohol.

I have ascertained that said salts may easily be prepared by neutralising the alkylamines and aminoalcohols by means of the p-aminobenzoic acid.

The salts are generally in the form of a crystalline substance and have the interesting therapeutic property of being sedative for the nervous systems by an hypnotic action, their toxicity being extremely low.

*Example 1.*—148 grams 100% base diethylamine dissolved in 200 cubic centimeters distilled water are treated with a suspension of 274 grams p-amino-benzoic acid in 800 cubic centimeters distilled water, treated with charcoal, filtered and concentrated in vacuum at low temperature till crystals are separated, further crystals being obtained by the same process from the motherliquors. The crystals are purified by washing with acetone. A practically theoretical output of a crystalline substance is obtained, which consists of p-aminobenzoate of diethylammonium, melting point 170/173° C. The substance is highly soluble in water.

*Example 2.*—14.8 grams 100% base diethylamine dissolved in 100 cubic centimeters acetone are treated with a solution of 27.4 grams p-aminobenzoic acid in 500 cubic centimeters acetone. A crystalline salt is promptly precipitated, filtered, washed with acetone and dried. The output of p-aminobenzoate of diethylammonium is practically the theoretical value. Melting point 170/173° C.

*Example 3.*—8.9 grams dimethylaminoethanol dissolved in 50 cubic centimeters ethylic ether are mixed with a solution of 13.7 grams p-aminobenzoic acid in 300 cubic centimeters ethylic ether. A white crystalline salt is promptly precipitated, washed with ether and dried. The salt consists of p-aminobenzoate of dimethyl-ethanolammonium, melting point 141/144° C., very easily soluble in water.

What I claim is:

1. A therapeutic substance acting on the nervous system, consisting of a salt of p-aminobenzoic acid with a lower alkylamine having a single amino group.

2. A therapeutic substance acting on the nervous system, consisting of a salt of p-aminobenzoic acid with a lower alkylaminoalkanol.

3. A therapeutic substance of sedative and hypnotic action, consisting of p-aminobenzoate of diethylamine.

4. A pharmaceutical preparation containing an active component consisting essentially of a p-aminobenzoic acid salt of a member of the group consisting of lower alkylamines having a single amino group and lower alkylaminoalkanols.

5. A pharmaceutical preparation containing an active component consisting essentially of a p-aminobenzoic acid salt of a lower alkylaminoalkanol.

References Cited in the file of this patent

UNITED STATES PATENTS

| Number | Name | Date |
|---|---|---|
| 2,144,552 | Shonle | Jan. 17, 1938 |
| 2,165,470 | Fisk | July 11, 1939 |
| 2,256,759 | Haim | Sept. 23, 1941 |
| 2,278,499 | Smith et al. | Apr. 7, 1942 |
| 2,403,473 | Anshacher | July 9, 1946 |
| 2,496,363 | Wilson et al. | Feb. 17, 1950 |

FOREIGN PATENTS

| Number | Country | Date |
|---|---|---|
| 175,169 | Switzerland | July 16, 1935 |

OTHER REFERENCES

Journal of American Chemical Society, pp. 2181–82, vol. 57 (1935), "Identification of Carboxylic Acids as Carboxylates of Benzylamine and Alpha-Phenyl-Ethylamine."